United States Patent
Edwards et al.

(10) Patent No.: US 7,577,364 B2
(45) Date of Patent: Aug. 18, 2009

(54) OPTICAL WIRELESS COMMUNICATIONS

(75) Inventors: David John Edwards, Oxford (GB); Dominic Christopher O'Brien, Oxford (GB); Grahame Edward Faulkner, Oxford (GB); David Michael Holburn, Cambridge (GB); Robert Joseph Mears, Cambridge (GB)

(73) Assignee: Isis Innovation Limited, Oxford (GB)

( * ) Notice: Subject to any disclaimer, the term of this patent is extended or adjusted under 35 U.S.C. 154(b) by 616 days.

(21) Appl. No.: 11/130,192

(22) Filed: May 17, 2005

(65) Prior Publication Data

US 2005/0207758 A1 Sep. 22, 2005

Related U.S. Application Data

(62) Division of application No. 10/399,326, filed as application No. PCT/GB01/04628 on Oct. 17, 2001, now Pat. No. 6,914,266.

(30) Foreign Application Priority Data

Oct. 17, 2000 (GB) .................................. 0025463.1

(51) Int. Cl.
*H04B 10/00* (2006.01)

(52) U.S. Cl. ...................... 398/118; 398/115; 398/116; 398/117; 398/126; 398/127; 398/128; 398/135; 398/58; 398/59; 398/60; 398/62; 398/64; 257/98; 257/88; 257/444

(58) Field of Classification Search ................. 398/115, 398/116, 117, 118, 119, 121, 124, 126, 127, 398/128, 129, 135, 136, 137, 138, 58, 59, 398/60, 61, 62, 63, 64, 182, 183; 257/98, 257/88, 444

See application file for complete search history.

(56) References Cited

U.S. PATENT DOCUMENTS

| 5,321,542 | A | * | 6/1994 | Freitas et al. | 398/127 |
| 5,416,627 | A | | 5/1995 | Wilmoth | |
| 5,485,055 | A | | 1/1996 | Keyser | |
| 5,493,437 | A | | 2/1996 | Lebby et al. | |
| 5,893,721 | A | | 4/1999 | Huang et al. | |
| 5,903,373 | A | * | 5/1999 | Welch et al. | 398/128 |
| 6,081,356 | A | * | 6/2000 | Branc et al. | 398/129 |
| 6,414,774 | B1 | * | 7/2002 | Scifres | 398/129 |
| 6,650,451 | B1 | * | 11/2003 | Byers et al. | 398/129 |
| 6,914,266 | B2 | * | 7/2005 | Edwards et al. | 257/98 |

FOREIGN PATENT DOCUMENTS

| EP | 0 513 993 A2 | 11/1992 |
| EP | 0 785 580 A2 | 7/1997 |
| WO | 96/08090 | 3/1996 |
| WO | 00/48338 | 8/2000 |
| WO | 01/28001 A1 | 4/2001 |

* cited by examiner

*Primary Examiner*—Hanh Phan
(74) *Attorney, Agent, or Firm*—Nixon & Vanderhye, PC

(57) ABSTRACT

An optical wireless local area network using line of sight optical links. The base station and terminal stations are provided with optical transceivers which include a transmitter array and detector array. The transmitter array consists of an array of resonant cavity light emitting diodes integrated using flip-chip technology with a CMOS driver circuit. The driver circuit includes constant bias, current peaking and charge extraction. The driver circuitry is compact and can be confined within a region underlying the corresponding light source. The detector array consists of an array of photo diodes, provided with sense circuitry consisting of a preamplifier and post-amplifier. The diodes and sense circuitry are also integrated using a flip-chip technique. The light emitter and the detector may include adaptive optical elements to steer and/or focus the light beams.

1 Claim, 17 Drawing Sheets

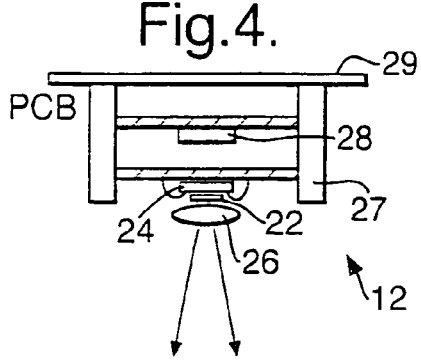
Fig.4.
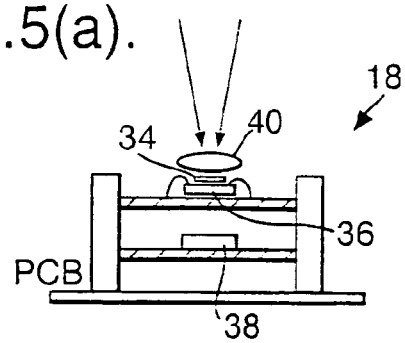
Fig.5(a).
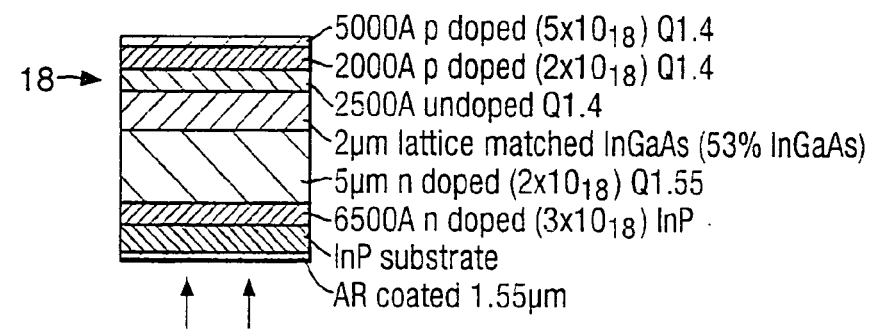
Fig.5(b).
Fig.6.
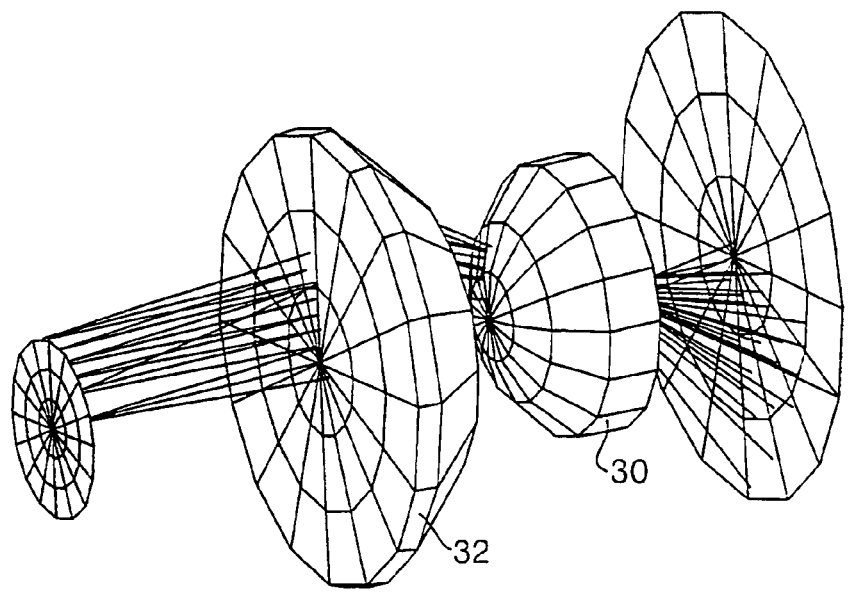

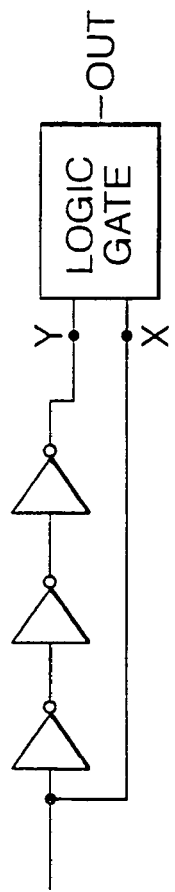
Fig.9(a).
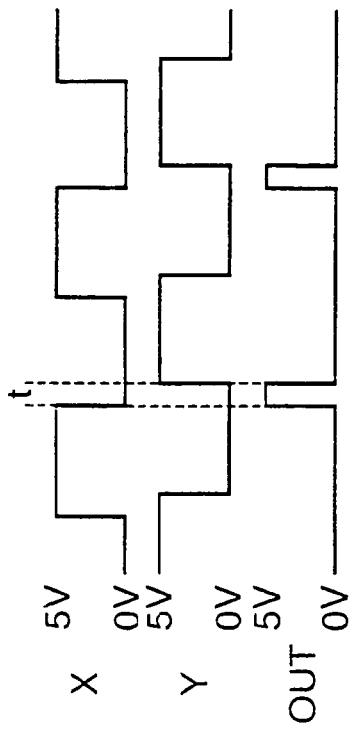
Fig.9(c). NOR-gate pulse generator
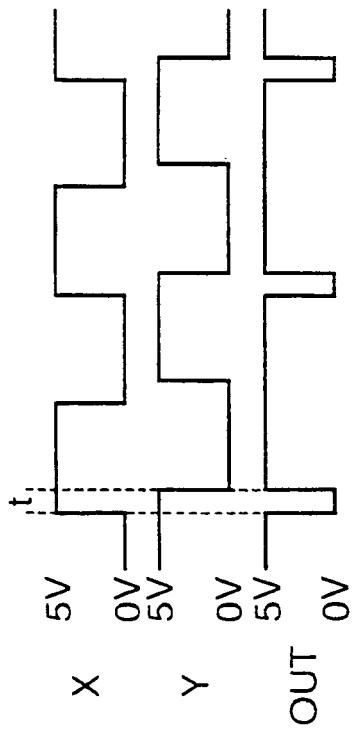
Fig.9(b). NAND-gate pulse generator

OPTICAL WIRELESS COMMUNICATIONS

CROSS REFERENCE TO RELATED APPLICATION

This application is a divisional of application Ser. No. 10/399,326, filed Dec. 18, 2003, now U.S. Pat. No. 6,914,266, which in turn is a U.S. national phase of international application PCT/GB01/04628 filed 17 Oct. 2001, which designated the U.S.

The present invention relates to improvements in or relating to optical wireless communications, particularly to optical wireless links for a local area network (LAN).

BACKGROUND OF THE INVENTION

The provision of voice data and visual communications to mobile users has become an important area of research and product development. The degree of mobility of users varies widely, from wide area "roaming" at one end of the range, to users within a room requiring a small degree of mobility but extremely high bandwidth communications at the other end of the range. Wireless communication links are essential for providing communications with mobile users, and while radio communications are useful in providing good coverage over large areas, the data transfer rates achievable with radio communications are rather limited compared to the data transfer rates achievable with fixed networks, for instance using fibre optics. Thus radio links tend to act as a bottleneck for data. The advantage of optical links over radio links, namely providing much higher bandwidth and thus much higher data transfer rate, is well-known. Optical local area networks (LANs) have been proposed, and fall into two main types as illustrated in FIGS. 1 and 2 of the accompanying drawings. Diffuse networks, as illustrated in FIG. 1, use a wide angle source 1 and scatter the light from surfaces in the room to provide an optical "ether" similar to that which would be obtained using a local radio transmitter. This produces coverage that is robust to blocking, so that the terminal 3 can receive data despite the direct line-of-sight path being blocked by, for instance, a human being 5. However, the multiple paths between the source 1 and receiver at the terminal 3 cause dispersion of the channel, thus limiting its bandwidth. The optical transmitters required are also extremely high power, and dynamic equalisation is required for high bandwidth. Proposed networks using this approach have provided approximately 10 Mb/s "ethernet" type bandwidth. This low data rate is necessary to avoid the difficulties caused by multipath dispersion.

An alternative approach, as illustrated in FIG. 2, is to use direct line-of-sight paths between a transmitter 7 and terminals 8. These can provide much higher data rates, but the coverage area provided by a single channel can be quite small. Therefore providing area coverage and the ability of users to roam presents difficult problems. There is an additional difficulty which is that optical channels are subject to eye safety regulations, and satisfying these regulations is difficult. The eye safety regulations are particularly strict for near infrared regions (between 700 and 1400 nm), and this means that there are limits on the power of the sources. Line-of-sight networks also have the problem of blocking of the channels, by people or objects.

BRIEF SUMMARY OF THE INVENTION

The present invention is concerned with an optical network which uses line-of-sight links, and provides a cellular coverage area. This type of network is illustrated schematically in FIG. 3 where a base station 10 is situated above the coverage area. The base station 10 is provided with a two-dimensional array of semiconductor light sources 12 which emit normal to their substrate and illuminate the coverage space with a series of cells 14. This is achieved by using a lens system 16 to match sources in the array to a particular angle, to create the desired coverage of the space. The use of an array of sources both minimises power transmitted, as sources not pointing at a detector can be switched off, and also each source may transmit different data. Further, detectors not pointing at a source can be turned off. As illustrated in FIG. 3, each terminal within the space has an optical system 16 which collects and focuses the light onto a particular detector 18 within a detector array 20. The resulting electrical signal is amplified and a data stream is extracted and supplied to the terminal 8. The use of the array of detectors allows the angle of arrival of the beam to be determined, and hence the direction of the required uplink (from the terminal 8 to the base station) to be determined. The use of the array of detectors, rather than a single large detector, advantageously reduces the capacitance of each detector, allowing a high bandwidth. Each detector has a narrow field of view, reducing problems with ambient light, but the use of the array allows a wide overall coverage. Although FIG. 3 illustrates only a transmitter at the base station and detector at the terminal, in practice each end of the link is a transceiver with an identical transmitter and receiver, to allow bidirectional data transfer. This system is designed to operate at 980 nm and can provide data rates of 155 Mb/s, but could also operate at any optical wavelength given suitable sources and detectors.

Further details of the light source 12 and detector 18 are illustrated in FIGS. 4 and 5. FIG. 4 illustrates schematically one of the light sources 12. It comprises an array of surface emitting LEDs or lasers 22 which are designed to emit through the substrate of the devices, normal to the substrate. This array is flip-chip bonded to a CMOS silicon integrated circuit 24. Light from the array is transmitted through a lens system 26 which directs individual beams to the correct part of the room. The assembly includes also a controller in the form of an integrated circuit 28 and all elements are provided in chip-rack packaging 27 bonded to a PCB 29. The transmitter optics are shown in FIG. 6 and this consists of two fixed optical elements 30 and 32. These are refractive lenses. However, it is also possible to use diffractive or fresnel optics to obtain the desired coverage pattern. The coverage pattern achieved is illustrated in FIG. 7, which shows a hexagonal array of overlapping cells 14.

The receiver is schematically illustrated in FIG. 5 and it consists of an array of detectors 34, which are photodiodes, which receive the incoming light through the back of the substrate and are flip-chip bonded to an array of sense circuits 36 which convert the signals from the detectors into data signals. These are supplied to a controller 38 for output to the terminal 8. Light is focussed onto the array 34 using a lens system 40 placed above the array. The use of an array of detectors reduces the capacitance of each detector in a similar manner to the reduction of capacitance of the light sources. Arrays of several hundred detectors may be needed for systems which offer coverage of over 20 sq.m.

The present invention is further concerned with certain components of the system. For instance, in one aspect the present invention provides an integrated solid state light emitter comprising a closely integrated and scalable array of solid state light sources with a corresponding array of drive circuits. Preferably, the emitter comprises a two dimensional unit cell array of solid state light sources formed in an emitter layer and superposed on a corresponding two dimensional unit cell array of respective drive circuits formed in a driver layer, each drive circuit producing a shaped drive signal for the corresponding light source in response to an input logic signal, wherein the surface area of each unit cell of the drive circuit array is less than or equal to the surface area of each unit cell of the light source array, whereby each drive circuit is confined within a region underlying the corresponding light source unit cell.

As an alternative, the solid state light sources need not be superposed on the drive circuits. Similarly, the solid state light sources could be arranged other than with respective drive circuits on a 1 to 1 basis.

By confining the area of the drive circuit within the region underlying the corresponding light source the light source array is easily scalable. In other words, the light source array can be made as large as desired, without particularly increasing the difficulty of fabrication.

A similar approach is used in the detector array. Thus another aspect of the invention provides an integrated solid state light detector comprising a two dimensional unit cell array of solid state light detectors formed in an detector layer and superposed on a corresponding two dimensional unit cell array of respective sense circuits formed in an sense circuit layer, each sense circuit for producing a data signal in response to an input light signal to the detector, wherein the surface area of each unit cell of the sense circuit array is less than or equal to the surface area of each unit cell of the detector array, whereby each sense circuit is confined within a region underlying the corresponding detector unit cell.

The key features of a suitable approach to integration are
(i) That the driver electronics are close to the emitters and the receiver electronics close to the detectors, in order to reduce the effects of the interconnection between the optoelectronic devices and electronics on system performance.

And/or that
(ii) The integration technology is scalable to large numbers of separate communications channels.

The invention described here uses a vertical stacking of components to achieve both these aims.

Other approaches might also be used, such as the use of specialised materials processing that allows the emitters and drive circuitry to be integrated onto a single substrate, and similarly for the receiver. Further it may be possible to integrate detectors, transmitters and electronics onto a single substrate in this way.

It may also be possible to use a intermediate substrate with emitter and driver attached separately to the substrate, with this providing the electrical interconnection between the two components.

Another option is to attach both emitter and detector array to a common silicon IC to produce a single component that can both emit and detect for a higher level of integration.

The light sources in the emitter may be resonant cavity light-emitting diodes or laser diodes which transmit light at a wavelength of about 900 nm or more, more preferably 1400 nm or more. In the detector, the individual detectors may be photodiodes and the detector may be provided with optical filter layers for narrowing the bandwidth of light received.

The arrays may be hexagonal close packed arrays and in both the emitter and detector the optoelectronic transducer and its associated electronic circuitry may be formed in two separate substrates which are then integrated together by a flip-chip technique. Preferably the electronic circuitry is formed in a CMOS circuit.

The drive circuits for the light source's emitter may be adapted to apply a constant bias current, as well as current peaking at the rising edge of the drive signal and charge extraction at the falling edge of the drive signal. This achieves a better shape to the response of the light source. In one embodiment this shaping of the drive signal is achieved using only logic switching circuits to produce edge-triggered pulses of short width.

The light emitter and/or the detector may include one or more adaptive optical elements, such as a spatial light modulator, to steer and/or focus at the light beam. The element may act as a Fresnel lens and/or a hologram.

In the detectors, the sense circuits may comprise a pre-amplifier and a post-amplifier, with the post-amplifier in one embodiment comprising a differential amplifier stage followed by a transimpedance amplifier.

These components may be used in an optical wireless local area network (LAN) comprising at least one base station and a plurality of terminal stations. The downlink from base station to terminal may be line-of-sight, whilst if a lower data rate is satisfactory the uplink from terminal station to base station may be an undirected (diffuse) optical link or a radio link.

BRIEF DESCRIPTION OF THE DRAWINGS

The invention will be further described by way of example, with reference to the accompanying drawings in which:
FIG. 4 illustrates schematically a transmitter for use in a cellular optical network;
FIG. 5(a) illustrates schematically a receiver for use in a cellular optical network;
FIG. 5(b) illustrates schematically a receiver for use in a cellular optical network;
FIG. 6 illustrates the optical system used in a transmitter;
FIG. 9(a) schematically illustrates generation of pulses for current peaking and charge extraction in the light source drive circuits;
FIG. 9(b) schematically illustrates generation of pulses for current peaking and charge extraction in the light source drive circuits;
FIG. 9(c) schematically illustrates generation of pulses for current peaking and charge extraction in the light source drive circuits.

DETAILED DESCRIPTION OF THE DRAWINGS

Figure 1:
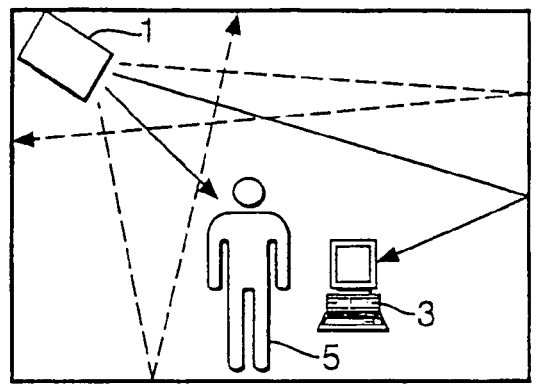
FIG. 1 illustrates a diffuse optical network.
Figure 2:
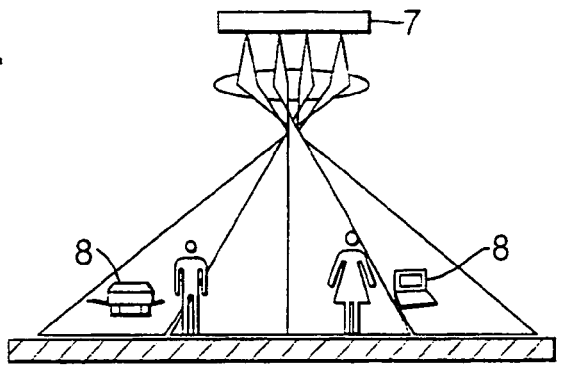
FIG. 2 illustrates a line-of-sight optical network.
Figure 3:
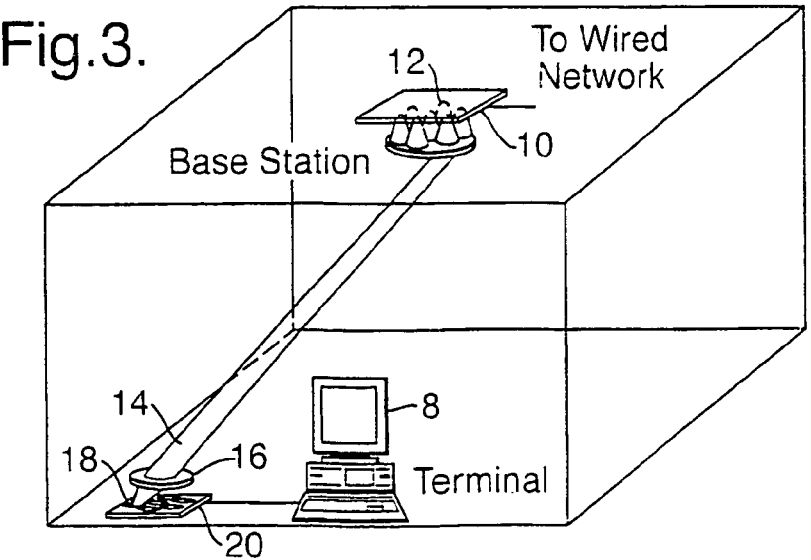
FIG. 3 illustrates a cellular optical network.
Figure 7:
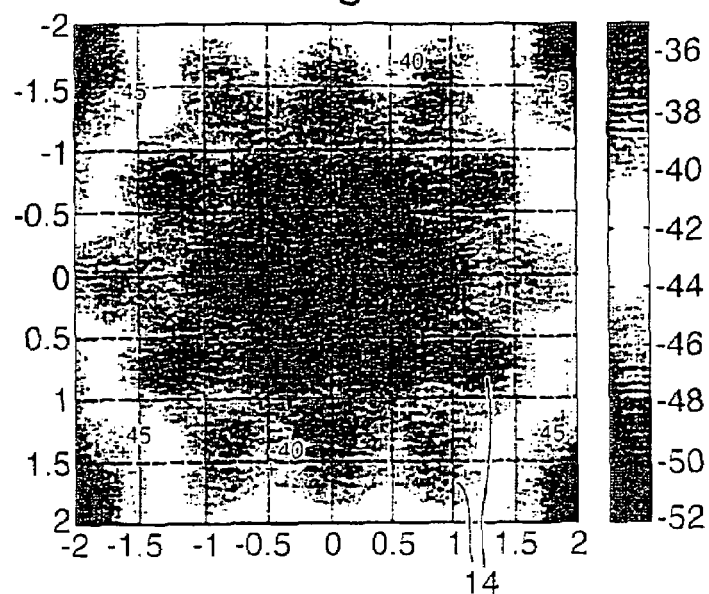
FIG. 7 illustrates the cellular coverage pattern obtained using the cellular network.
Figure 8:
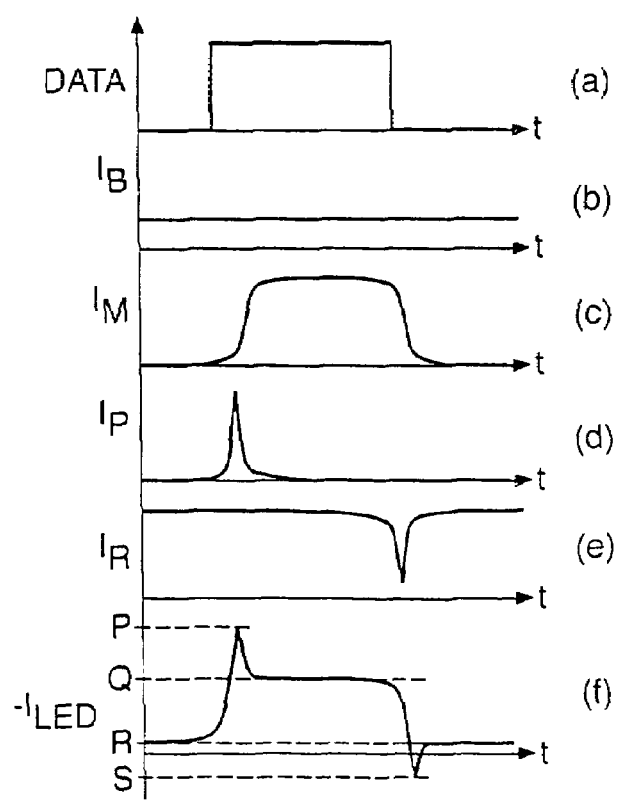
FIG. 8(a) illustrates signals in the driver circuits for the light sources.
FIG. 8(b) illustrates signals in the driver circuits for the light sources.
FIG. 8(c) illustrates signals in the driver circuits for the light sources.
FIG. 8(d) illustrates signals in the driver circuits for the light sources.
FIG. 8(e) illustrates signals in the driver circuits for the light sources.
FIG. 8(f) illustrates signals in the driver circuits for the light sources.

As indicated above, the light source in the system consists of an array of light emitters, in this embodiment resonant cavity light emitting diodes. The diodes are driven by respective driver circuits implemented as current sources. Thus the driver circuit converts a digital voltage input signal into a train of current pulses. In order to improve the optical rise time and fall time of the LED, the drivers provide a small bias current $I_B$ to the LED at all operational times. This keeps the space-charge capacitance charged, avoiding a delay in carrier injection and a consequent delay in light output. To further improve the rise time and fall time, peaking current is injected in the form of a current spike $I_P$ into the diode terminal at the start of each low to high transition in the data signal. This is followed by a controlled decay to the steady high level of the data signal. Fall-time at the end of the input signal can be reduced by injecting a reverse current $I_R$ into the diode at the beginning of each high to low transition. This is known as charge extraction. FIG. 8 illustrates the input data signal at FIG. 8(a) (which is 5V peak-to-peak and has 0.1 ns rise and fall time), the constant bias current $I_B$ in FIG. 8(b) and the basic drive signal (without current peaking or charge extraction) at FIG. 8(c). FIGS. 8(d) and (e) illustrate the current peaking and charge extraction currents respectively, and FIG. 8(f) indicates the actual drive signal formed by combining $I_B$, $I_M$, $I_P$ and $I_R$. The result of using the drive signal $I_{LED}$ is that the output of the LED more accurately reflects the shape of the input data signal.

In order that large arrays of light sources can be constructed it is advantageous if the drive circuitry for each light source is of similar or smaller surface area than the light source itself. This means that an integrated component can then be produced in which the drive circuitry for each light source underlies the corresponding light source. The array is then scalable, i.e. it can be made as large as desired without fabrication problems caused by the drive circuit for one light source extending under another light source.

One embodiment of drive circuitry achieving this will be described with reference to FIGS. 9 to 12. In this embodiment the current peaking and charge extraction pulses are formed as edge-triggered pulses of a short width. This has the advantage that no external components, such as capacitors or resistors are required, meaning that the driver circuit can be fabricated with all components on an integrated circuit. FIG. 9 illustrates schematically the generation of the short pulses. The input data signal is applied to a string of inverters and a two input logic gate as illustrated in FIG. 9(a) The inverters effectively delay the data pulse by a short interval. The type of the logic gate then determines whether the output pulse signal is triggered on the rising edge or the falling edge of the data signal. From FIG. 9(b) it can be seen that a NAND logic gate produces a negative pulse on the rising edge of the signal. This pulse can be used for current peaking. A NOR logic gate generates a short positive pulse on each falling edge of the data signal, which can be used to form the charge extraction pulse. The width of the pulses is determined by the gate delay introduced by the inverter string. With appropriately designed inverters, the length of the delay introduced may be controlled externally.

Figure 12:
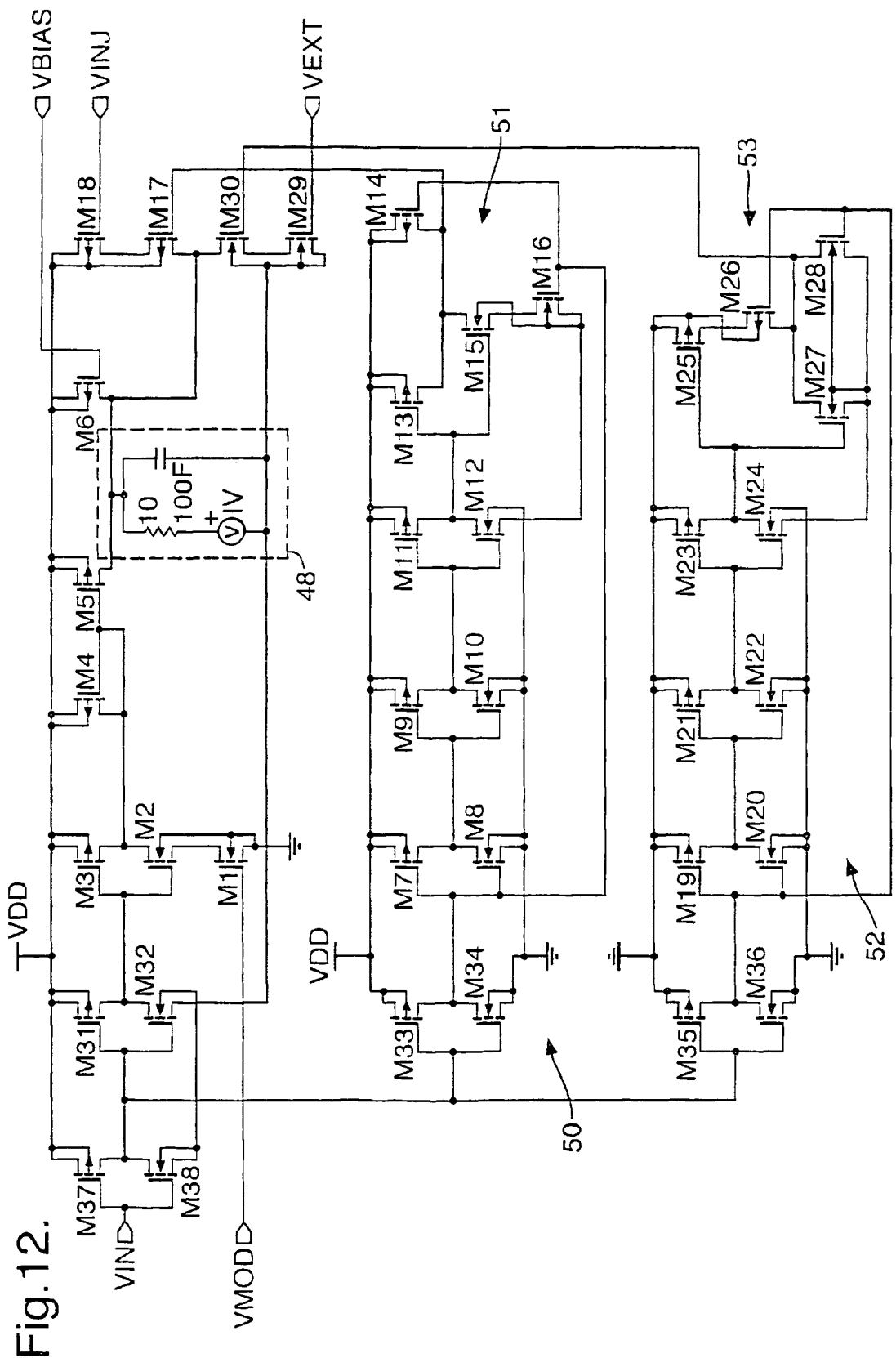
FIG. 12 illustrates the complete driver circuit.

FIG. 12 illustrates the full driver circuit. The input and output pins are listed and described in Table 1 below.

| Pin name | Signal type | Function |
| --- | --- | --- |
| $V_{IN}$ | Logic | Data signal |
| $V_{MOD}$ | Linear | LED modulation current adjust |
| $V_{BIAS}$ | Linear | LED quiescent current adjust |
| $V_{EXT}$ | Linear | Charge extraction adjust |
| $V_{INJ}$ | Linear | Current peaking adjust |

In FIG. 12, transistor pairs M7-M8, M9-M10 and M11-M12 form a chain of invertors for the NAND-gate pulse generator 50. Transistors M13, M14, M15 and M16 form a NAND gate 51. The output pulse from this generator drives the gate of pass transistor M17. This pass transistor conducts the drain current from M18 (determined by $V_{INJ}$) for a very short duration. This injection current is applied to the LED represented by equivalent circuit 48.

Transistor pairs M19-M20, M21-M22 and M23-M24 form the invertor string for the NOR-gate generator 52. The NOR-gate is made of four transistors M25, M26, M27 and M28. This pulse generator drives pass transistor M30 and the reverse current produced is determined by the amount of current that M29 conducts, which, in turn, is determined by the magnitude of $V_{EXT}$. Transistors M31-M38 are invertor buffers which enable the data signals to drive subsequent loads.

The bias current $I_B$ is provided by transistor M6. The input data signal drives a CMOS switch (comprising transistors M2 and M3) which conduct the current from transistor M1 to the input of the current mirror formed by transistors M4 and M5.

This current is then amplified to provide the modulation current $I_M$ which is the basic drive signal for the diode.

Figure 10A:
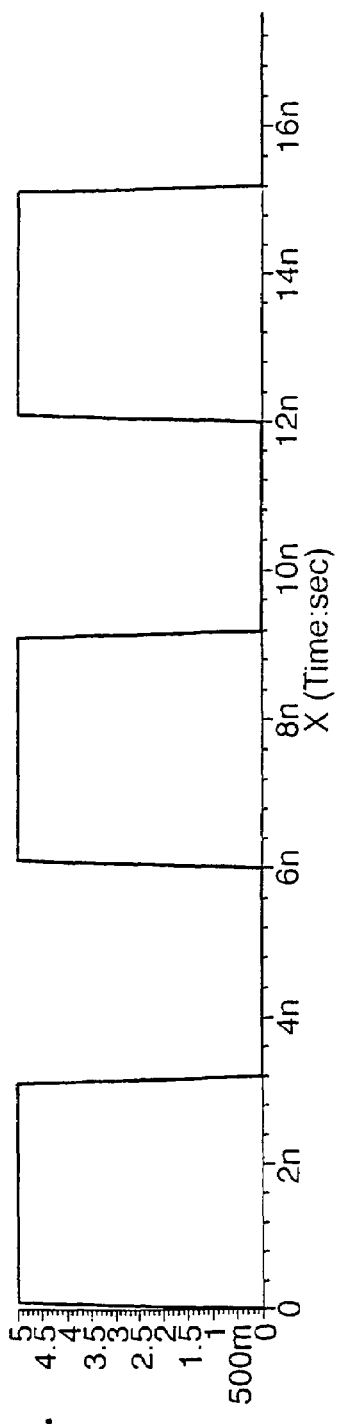
FIG. 10(a) illustrates signals in drive circuits without charge peaking and charge extraction;
illustrates signals in drive circuits without charge peaking and charge extraction.
Figure 10B:
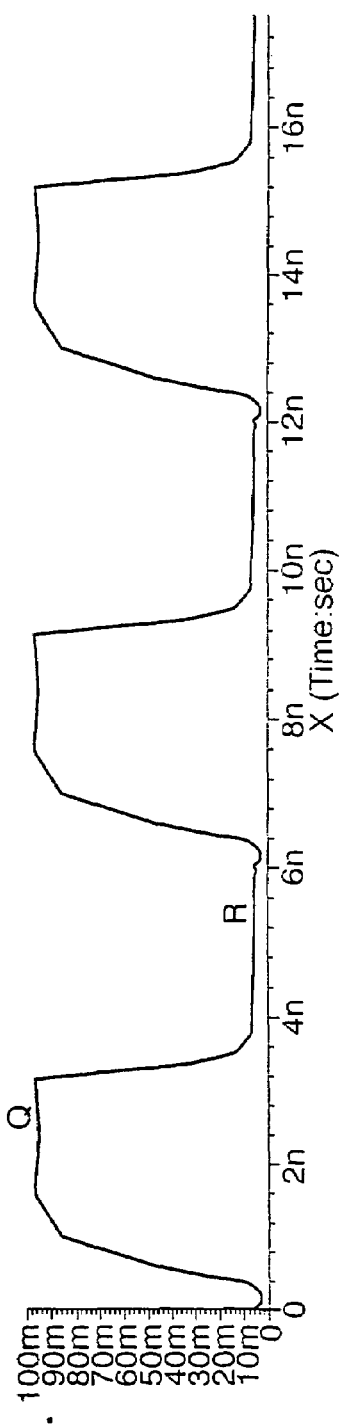
FIG. 10(b) illustrates signals in drive circuits without charge peaking and charge extraction.
Figure 10C:
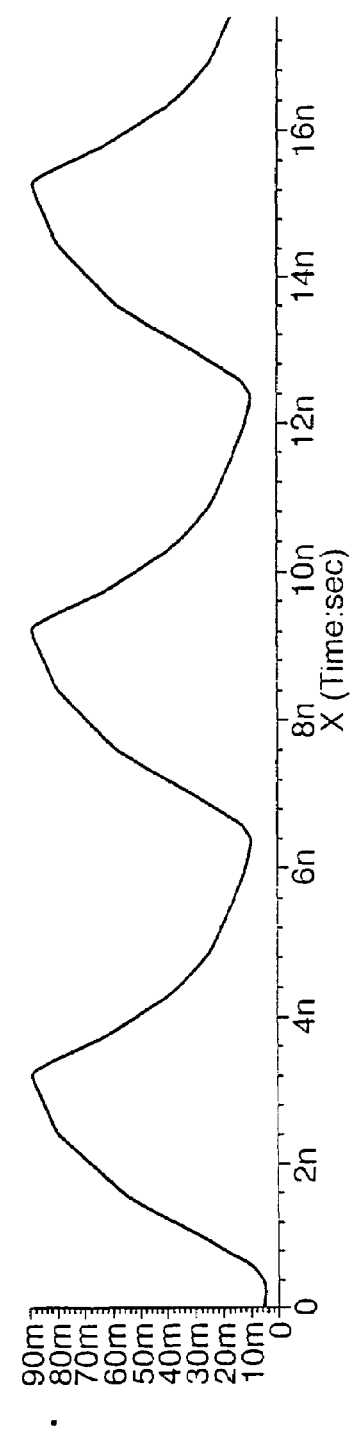
FIG. 10(c) illustrates signals in drive circuits without charge peaking and charge extraction.

FIGS. 10 and 11 illustrate the signals in the driver circuit. FIG. 10 illustrates the effect of driving the LED 48 without any current peaking or charge extraction. Thus the input is shown at FIG. 10(a), FIG. 10(b) illustrating the total diode current (ie. the total current into equivalent circuit 48) with FIG. 10C illustrating the resistive diode current (ie. the current down the resistive branch of the equivalent circuit 48). The resistive current corresponds to the light output. It can be seen that the waveform has long rise and fall times, and is not shaped like the data signal.

Figure 11A:
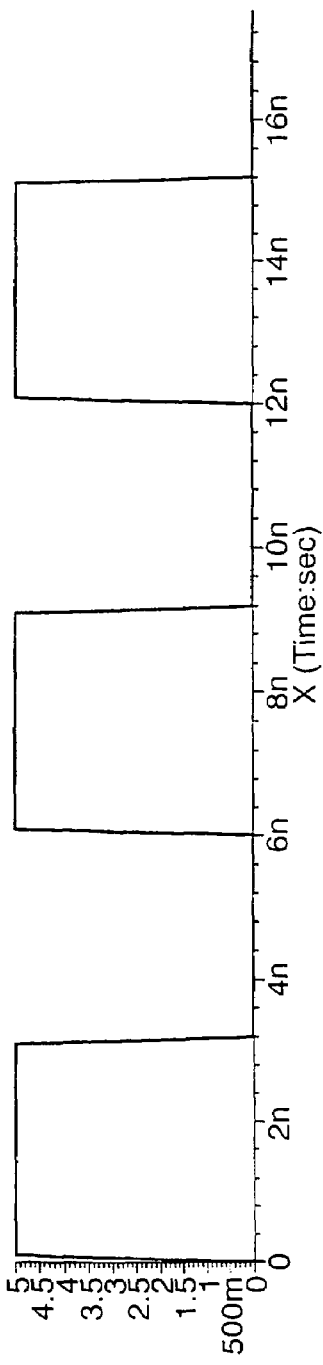
FIG. 11(a) illustrates signals in drive circuits with charge peaking and charge extraction.
Figure 11B:
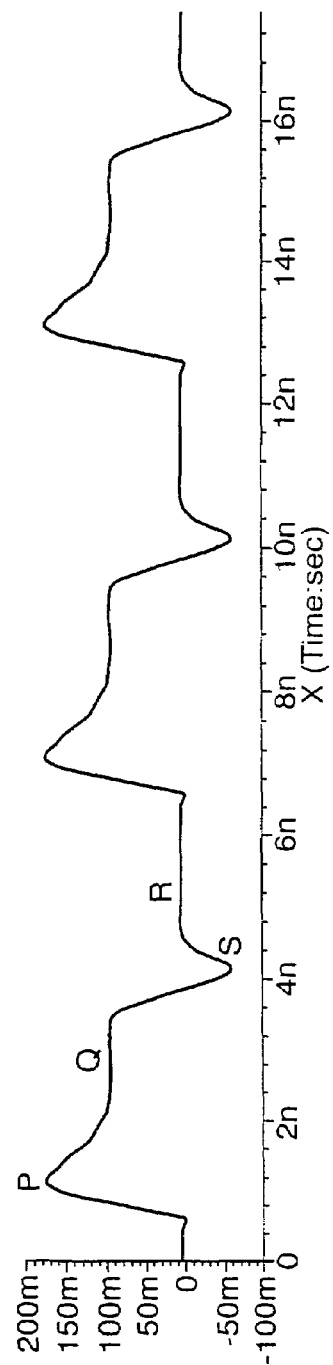
FIG. 11(b) illustrates signals in drive circuits with charge peaking and charge extraction.
Figure 11C:
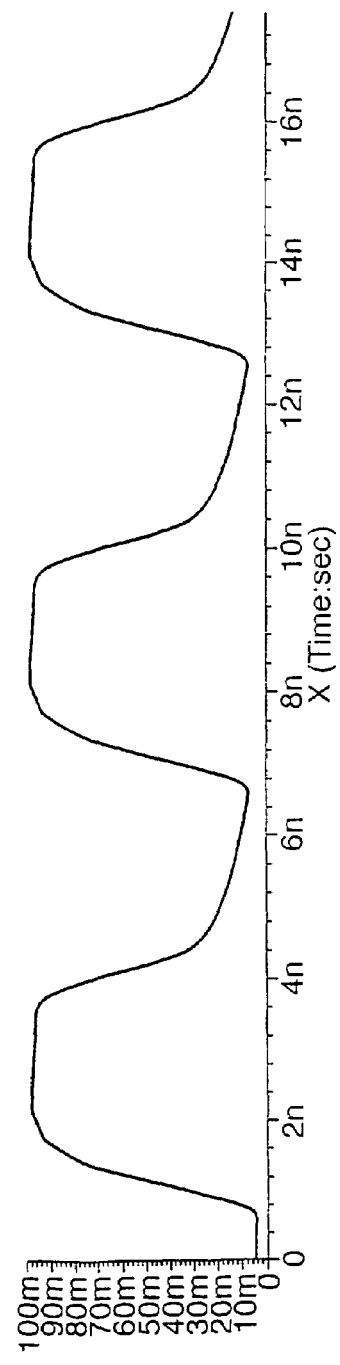
FIG. 11(c) illustrates signals in drive circuits with charge peaking and charge extraction.

FIG. 11 shows the effect of driving the LED using the shaped drive signal, which includes current peaking and charge extraction. Again FIG. 11(a) shows the data signal, FIG. 11(b) shows the total LED current with current peak P, steady drive signal Q, and charge extraction S. FIG. 11C illustrates the resistive diode current, corresponding to the illumination. It can be seen that the rise time and fall time have been significantly reduced, the waveform corresponding much more closely to the input data signal.

The light sources are 980 nm bottom emitting Resonant Cavity LEDs, grown on double polished n+ GaAs substrates. The emission wavelength and emission angular beam profile are set by the emission wavelength of the active region (quantum wells) and the resonance wavelength of the cavity. The difference between the two wavelengths is known as detuning, and this is optimised to maximise the power received at the photodetector for the particular optical system used. The particular wavelength within this rage (980-1000 nm) is chosen to be (ideally) within an optically quiet region of the ambient light optical spectrum.

Figure 22:
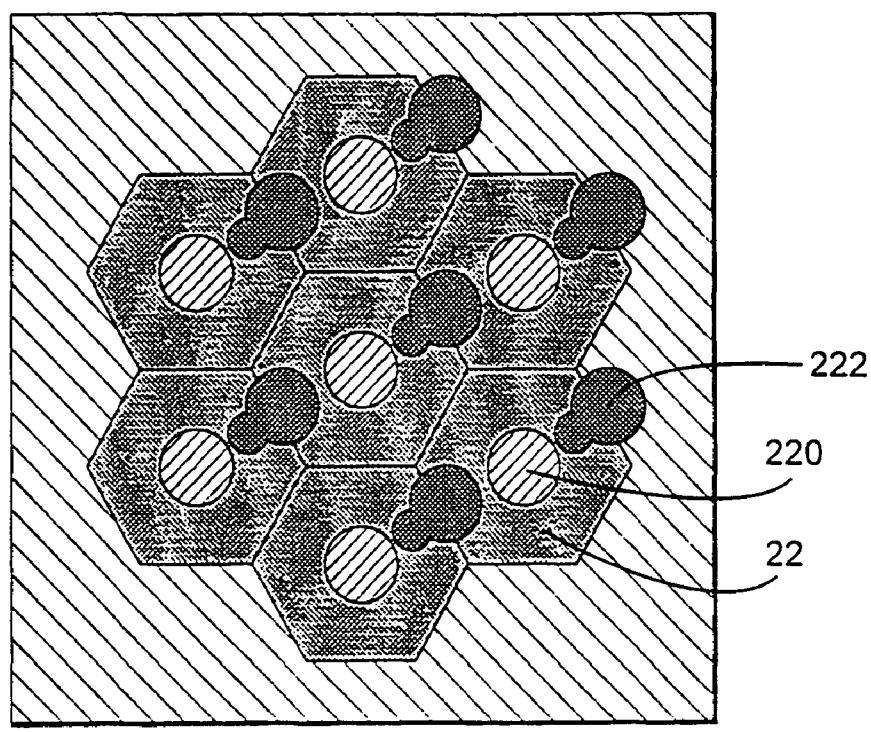
FIG. 22 illustrates a light source array.

The plan view of the light source array is shown in FIG. 22. The sources 22 are on a hexagonal pitch of 300-500 μm or so. The hatched contacts 220 are the p contacts, on the rear of the device, and the solid contacts 222 are the n contacts.

The light source array is flip-chip bonded to the CMOS driver circuits formed on a separate substrate to produce an integrated light emitter.

Figure 13:
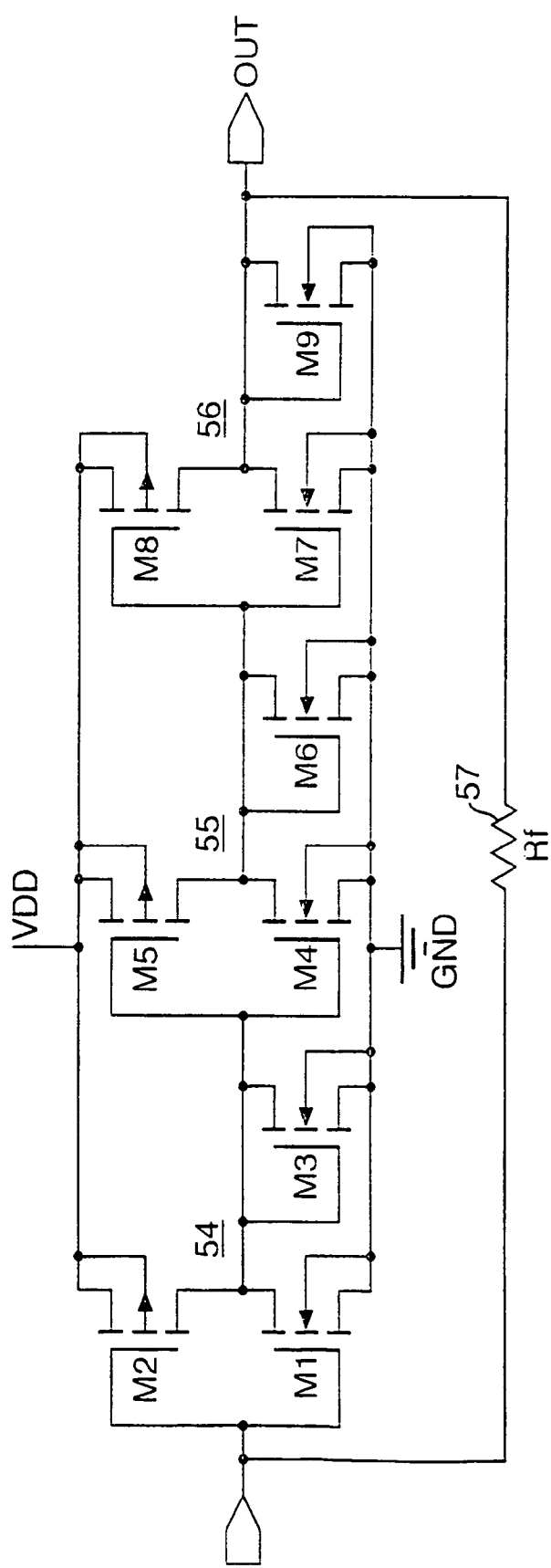
FIG. 13 illustrates the pre-amplifier used in the sense circuit of a detector.
Figure 24:
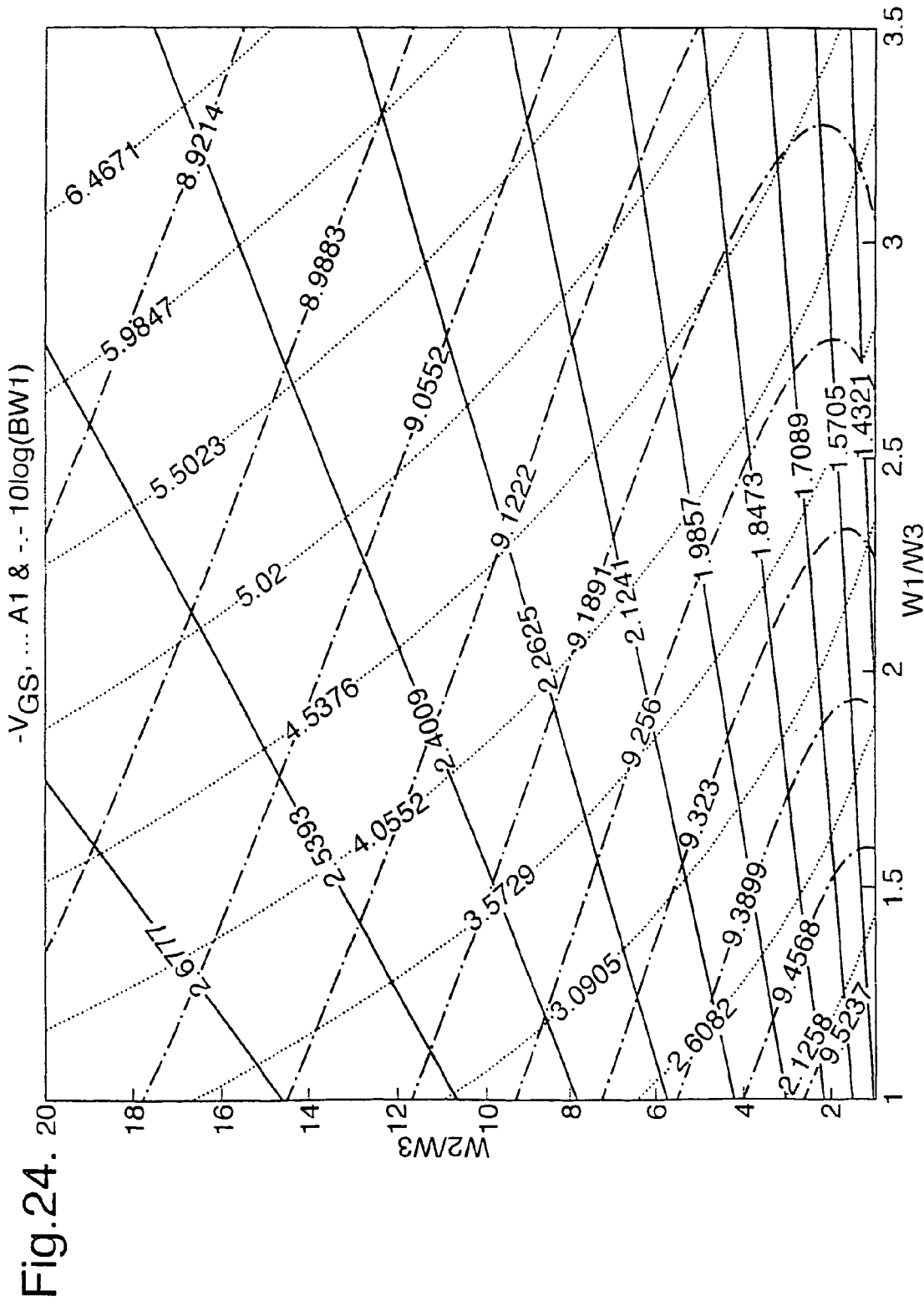
FIG. 24 illustrates a nomograph.

The receiver uses an array of photo diodes (34) each supplying its signal to a respective sense circuit consisting of a pre-amplifier followed by a post-amplifier. The pre-amplifier is a three stage transimpedance amplifier with an NMOS load at the output of each stage to control gain and stability. This is shown schematically in FIG. 13. Each stage consists of a CMOS inverting amplifier with a diode-connected NMOS load. The amplifier is designed to have a −3 dB bandwidth of 217 MHz. The bandwidth of each stage is set as 939.93 MHz. This corresponds to a phase shift of 13° per stage at the gain-bandwidth. The complete amplifier also includes a feedback resistor 57. The width and length of the transistors are defined by a special algorithm based on the use of a precomputed nomograph shown in FIG. 24.

The nomograph is computed from known parametric data corresponding to the CMOS process to be used. It relates DC bias conditions, bandwidth, stability and gain with transistor dimensions W1, W2 and W3 in a manner not practicable using traditional design methods. This approach allows optimised values to be chosen for the transistor dimensions.

Figure 14:
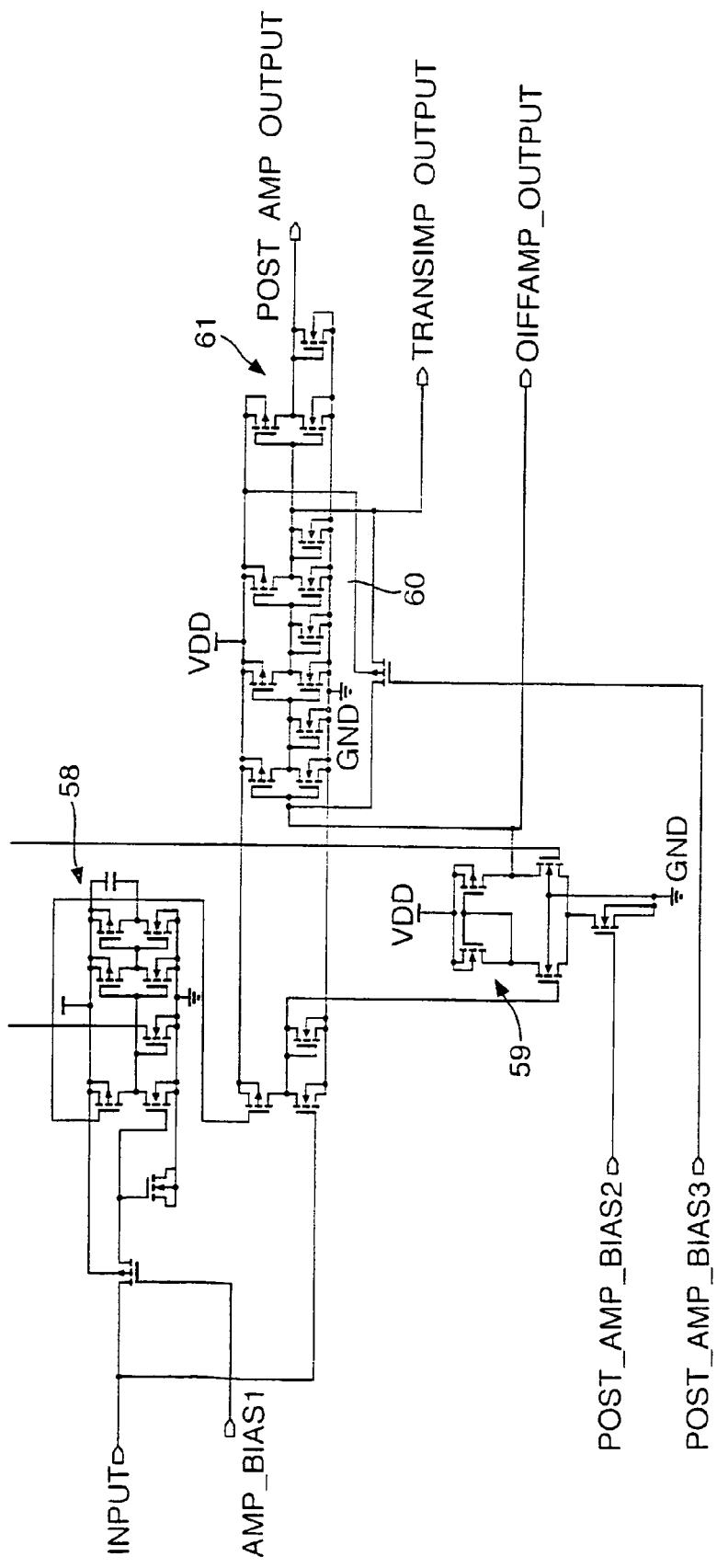
FIG. 14 illustrates the post-amplifier used in the sense circuit of the detector.

The post-amplifier is schematically illustrated in FIG. 14. It is a three stage amplifier. The first stage is a DC-coupled inverting amplifier 58 with DC stabilisation to maintain correct operating conditions. The stabilisation circuit also serves to curtail the low frequency response to reduce the effect of unwanted low frequency noise. The second stage is a differential amplifier 59 which produces an output current that is amplified by the third stage of amplification 60, a transimpedance amplifier. A final stage of amplification consists of an invertor and a diode-coupled NMOS transistor 61. The use of a differential amplifier allows, where desired and with the addition of the necessary extra circuit elements, signals from different detectors to be combined together. This allows a plurality of signals of different strengths to be combined together in different proportions depending on their strengths.

The detectors are substrate illuminated InGaAsP PIN diodes grown on InP substrates. These will operate at both 980 and 1500 nm. The I-region is relatively thick for these types of device, in order to minimise the capacitance. The bandwidth of the circuit is limited by the capacitance and the transit time for carriers to pass across the detector junction. These two are competing and preferably the detectors work at an optimum point between these effects. The thickness of the detector and the DC bias voltage of the detector are optimised to achieve this.

Figure 23:
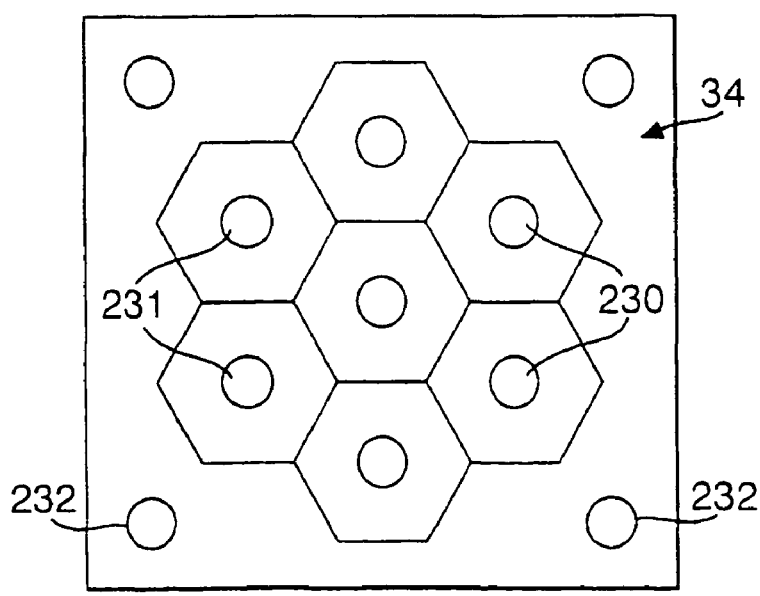
FIG. 23 illustrates a detector array.

The plan view of the detector array is shown in FIG. 23. The detectors 230 are close packed on a hexagonal pitch of 300-500 μm or so, with one contact 231 per device, and ground contacts 232 around the periphery.

The detector picks up the desired power (at a specified wavelength) and optical noise over a range of wavelengths. Narrowing the optical bandwidth by integrating optical filters with the detectors can be achieved using the structure shown in FIG. 5B in which filtering is provided by the layer (a) consisting of InGaAsP of an appropriate composition.

The optical receiver is fabricated using CMOS process technology. The preamplifier and post-amplifier are both formed in the same substrate, both fitting within the surface area of the photo diode supplying them. In fact, of course, an array of amplifiers is formed, corresponding to the array of photo detectors. The sense circuitry and detector array are flip-chip bonded together to form an integrated device. Except for the photo diode detector and decoupling capacitors, the receiver chip requires no external circuit components. In this implementation three sets of power/ground supplies are used for the analog circuitry and substrate. This prevents noise coupling from switching (digital) circuitry onto sensitive (analog) circuitry through the low resistive paths to the power supply. Externally the analog and substrate power/ground supplies are connected in order to suppress the source-to-bulk noise voltage effect that can corrupt the transistor drain current.

Figure 15:
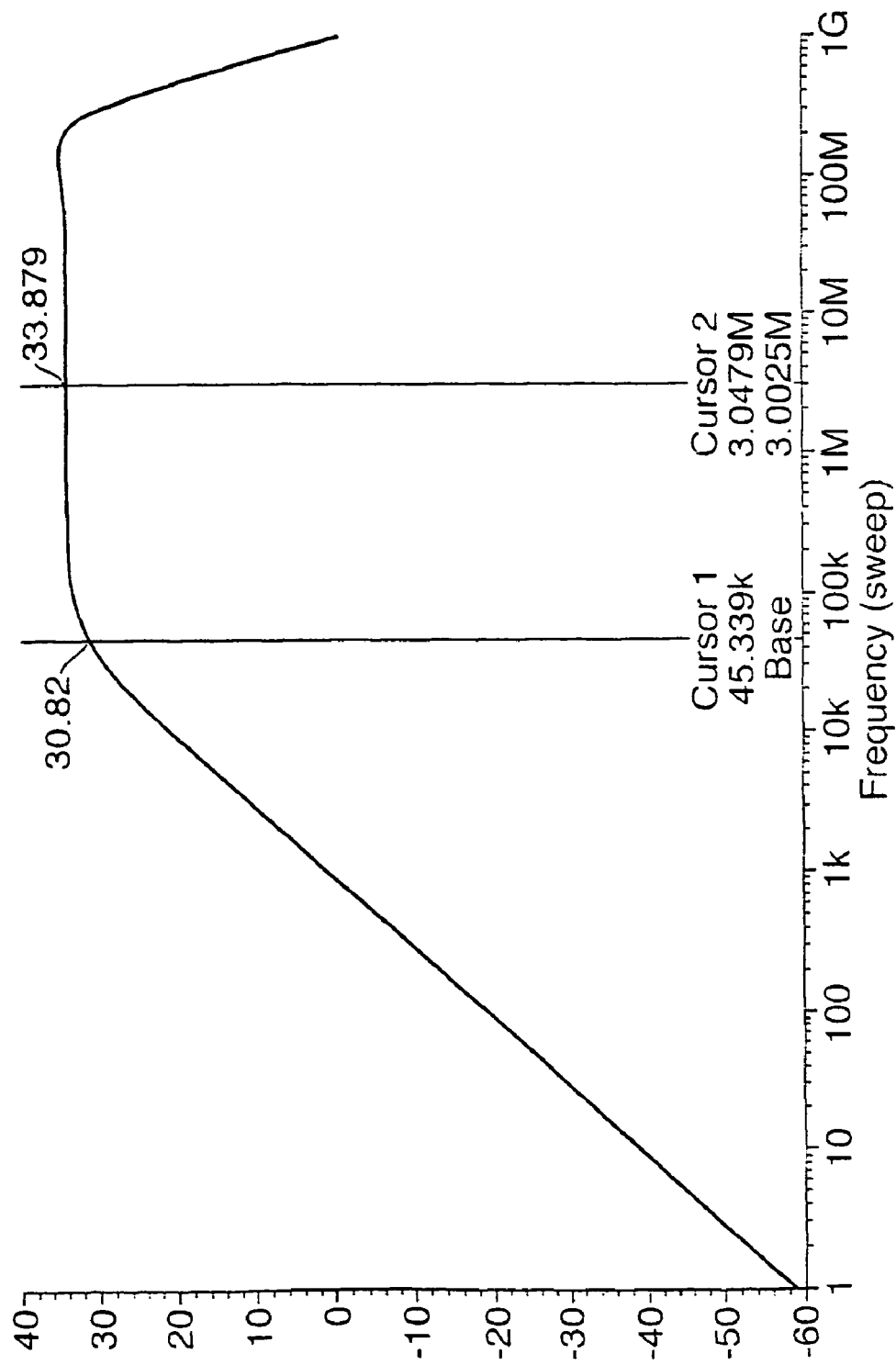
FIG. 15 illustrates the transfer function of the post-amplifier of FIG. 14.
Figure 16A:
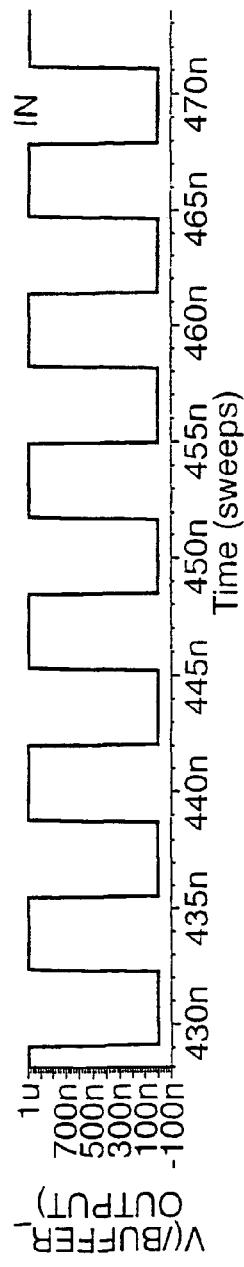
FIG. 16(a) illustrates the transient response of the receiver.
Figure 16B:
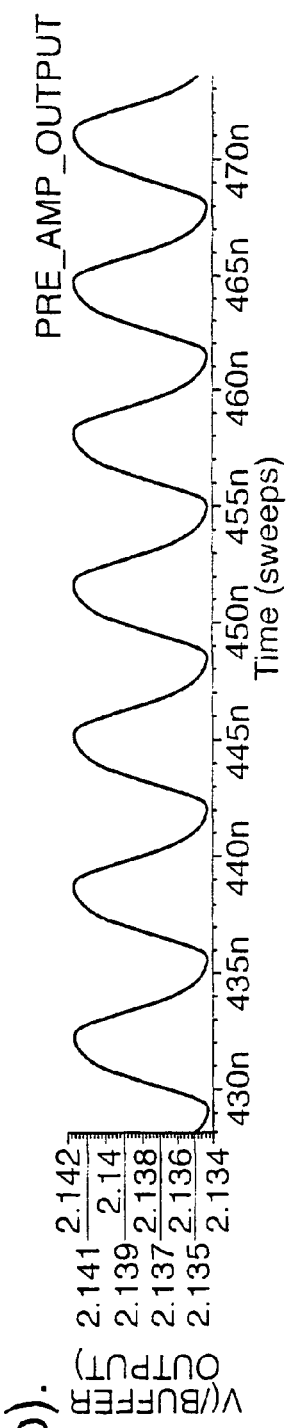
FIG. 16(b) illustrates the transient response of the receiver.
Figure 16C:
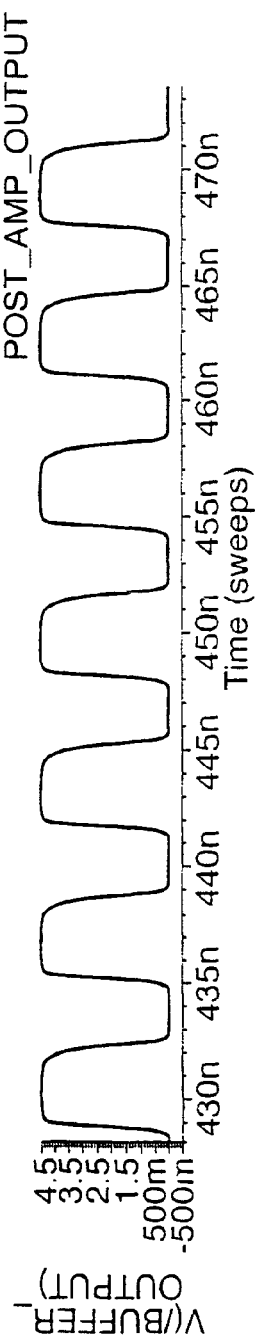
FIG. 16(c) illustrates the transient response of the receiver.
Figure 16D:
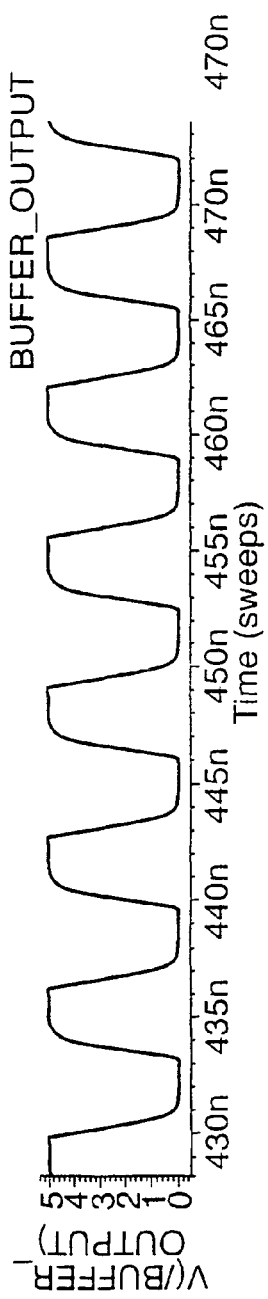
FIG. 16(d) illustrates the transient response of the receiver.

The transfer function from the post-amplifier voltage input to final output is illustrated in FIG. 15.

FIG. 16 illustrates a simulation of the transient response of the receiver circuit under typical conditions. FIG. 16(a) illustrates the input current signal, FIG. 16(b) the pre-amplifier output voltage, FIG. 16(c) the post-amplifier output voltage and FIG. 16(d) the final buffer output voltage.

One of the chief difficulties in a fixed optical wireless design is the power budget. Even with fixed optics, only a small fraction of the available power within a cell is received at the photo diode. This problem is compounded by the large fall off in optical power density towards the edge of the cell. In order to optimise the power budget of the optical link, it is possible to focus the light from the transmitter onto the detector, or to steer the light beam onto detectors at the receiver. This is achieved by using an adaptive optical element which can take the form of a Fresnel lens or a computer generated hologram. These can be achieved using a spatial light modulator which is an electronically addressed, pixelated device capable of binary phase modulation. For instance, devices which use nematic liquid crystals and having a pixel pitch of 42 micrometers with 640 by 480 pixel resolution are available. Patterns can be programmed into the device (to define the state of each pixel) such that the device acts as a desired optical element.

Figure 17A:
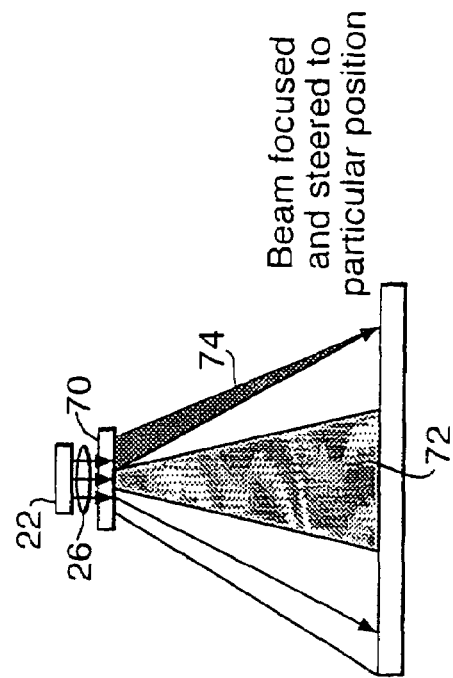
FIG. 17(a) illustrates the use of adaptive optical elements to steer and focus light beams in the optical network.

FIG. 17(a) illustrates the use of an adaptive optical steerer 70 in front of the fixed optical element 26 and source array 22. The adaptive optical steerer 70 is effective to move the emitted beams within their cells.

Figure 17B:
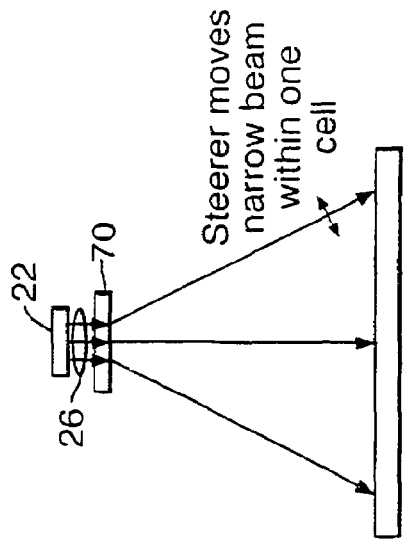
FIG. 17(b) illustrates the use of adaptive optical elements to steer and focus light beams in the optical network.

FIG. 17(b) illustrates the use of the adaptive optical elements 72 to focus and steer the beams from the source array 22. The central beam 72 illustrate the output with the adaptive optics inactive, whereas beam 74 illustrates the effect of focussing and steering the beam using the adaptive optical element.

Figure 17C:
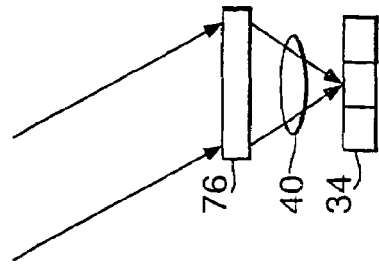
FIG. 17(c) illustrates the use of adaptive optical elements to steer and focus light beams in the optical network.
Figure 17D:
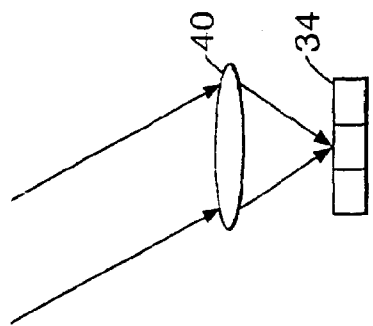
FIG. 17(d) illustrates the use of adaptive optical elements to steer and focus light beams in the optical network

FIG. 17(c) illustrates the use of an adaptive optical element 76 in the receiver. The element is programmed to steer and focus the beam through the fixed optical element 40 on to the detector array 34. The adaptive optical element can be programmed to steer the beam to a particular detector in the array and this configuration allows light from multiple transmitters to be focussed on to the same detector, for instance to allow "handover" between base stations. FIG. 17(d) illustrates a comparative example which lacks the adaptive optical element. It may be possible to reduce the number of elements in the array to a single detector with the use of adaptive optics.

Rather than using a spatial light modulator, deformable mirrors or other adaptive optical elements may be used.

Figure 20:
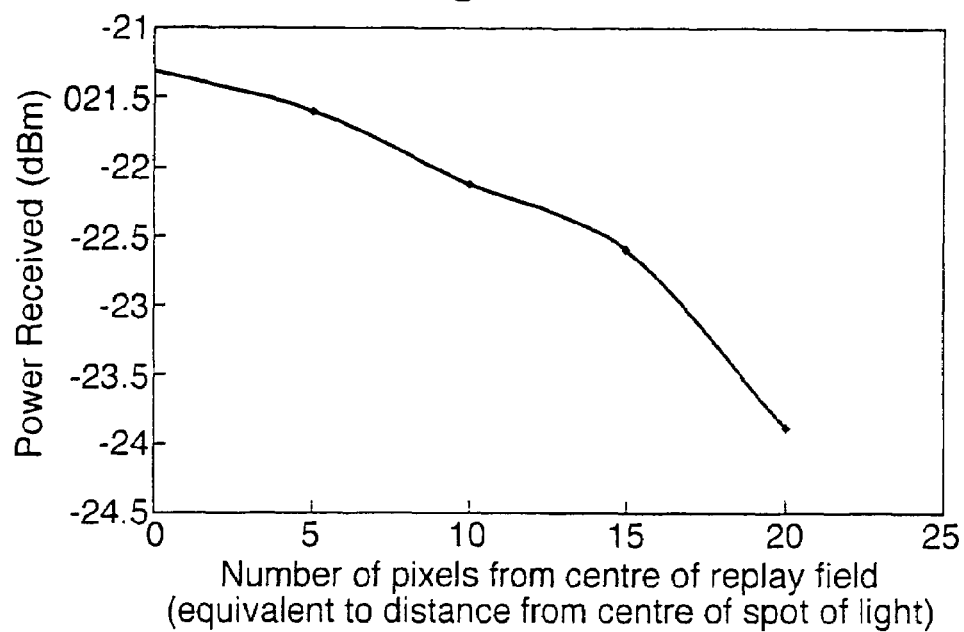
FIGS. 20 and 21 illustrate the power coupled to the detector when using adaptive optical elements.
Figure 21:
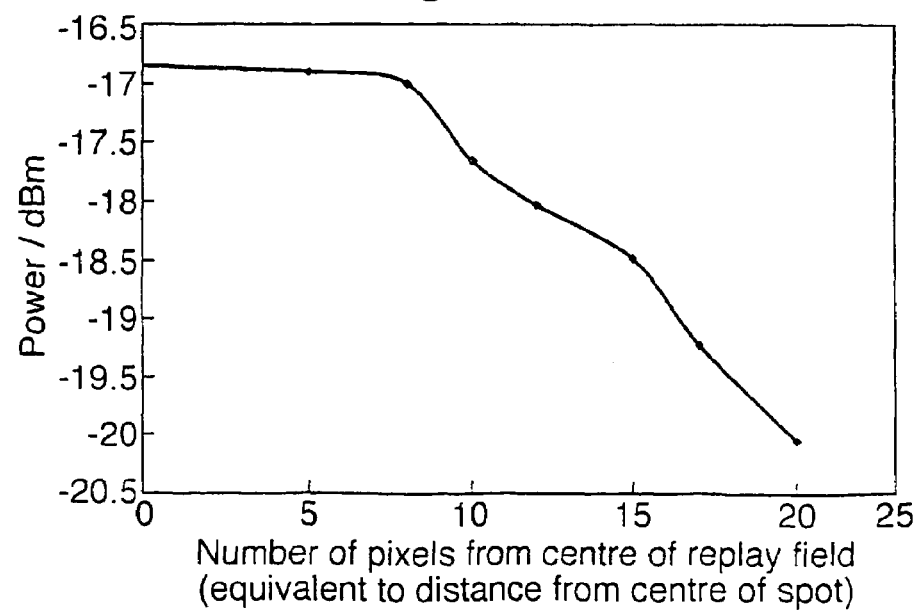

FIG. 20 illustrates how the power coupled to the receiver varies as it is displaced from its central position when the adaptive element is designed to focus to a 1×1 target area. In FIG. 21, a larger (3×3) target area is used creating a larger "spot" of light so the receiver is less sensitive to displacement from its desired position.

Figure 25:
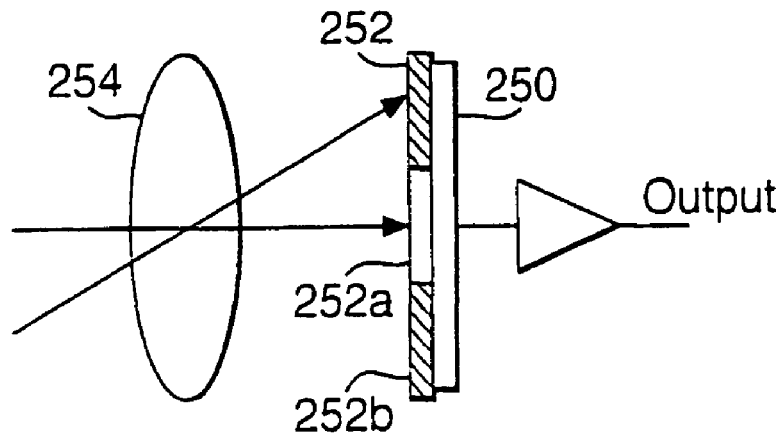
FIG. 25 illustrates diagrammatically an alternative receiver arrangement.

FIG. 25 illustrates an alternative receiver which uses a single detector 250 rather than a detector array. In this embodiment the detector 250 is a photomultiplier, preferably a solid state photomultiplier such as a Photek PMT 110 or the like. Photomultipliers have a low capacitance, and thus the use of a photomultiplier also has the advantage of allowing the detector to have a large area and a high bandwidth and they are much more sensitive than photodiodes. The use of a single detector rather than an array removes the need for processing circuitry to combine the signals from several detectors.

In order that the receiver can track the light source and can reject noise (i.e. extraneous light from other angles), an optical shutter 252 is positioned over the single detector so that different areas of the detector can be selectively exposed as at 252a or shut-off as at 252b. A spatial light modulator (SLM) may be used for this such as CRL 128×128 2D SLM. The optical shutter 252 may have an essentially binary characteristic, such that its areas 252a, b etc are "on" or "off". Alternatively an analogue (variable transmittivity) may be used to allow different proportions of the input signal from different directions to be incident upon the detector, and thus to combine in different weights (according to the transmittivity of the optical shutter areas). This can improve noise rejection by allowing combination of signals in proportion to their signal-to-noise ratios.

As with the previous receiver embodiment a lens system 254 collects the incoming light and in combination with the optical shutter 252 gives the angular sensitivity to the receiver.

Figure 26:
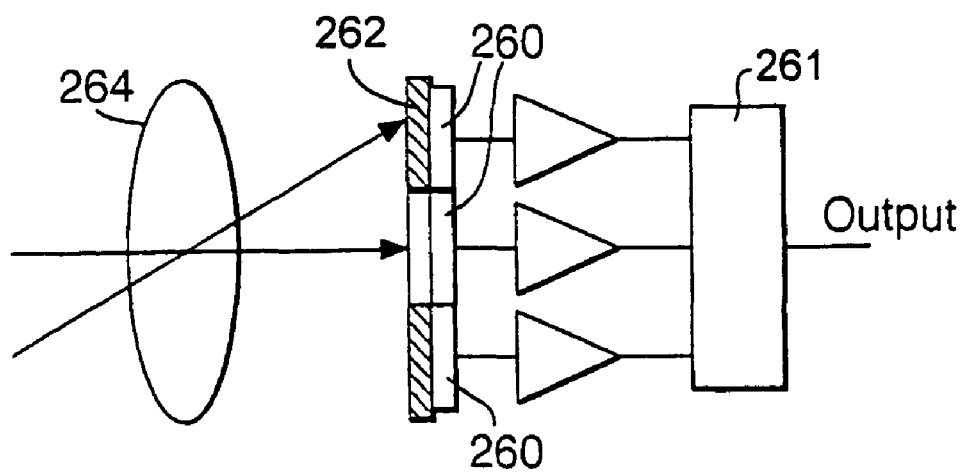
FIG. 26 illustrates diagrammatically a further alternative receiver arrangement.

Rather than using a single detector and optical shutter, the optical shutter may be combined with an array of small area detectors 260 as shown in FIG. 26. The signals from the individual detectors 260 may be combined through a simple summing circuit 261. Thus the angular selectivity is provided optically by lens system 264 and optical shutter 262. This allows simplification of the signal processing electronics.

The use of the optical shutter 252, 262 allows the overall shape of the detector area to be varied as desired which can allow compensation for alterations and imperfections in the optical system.

The receiver may be used as a "hub" in an optical LAN allowing the reception of time-multiplexed signals from different light sources.

Figure 18A:
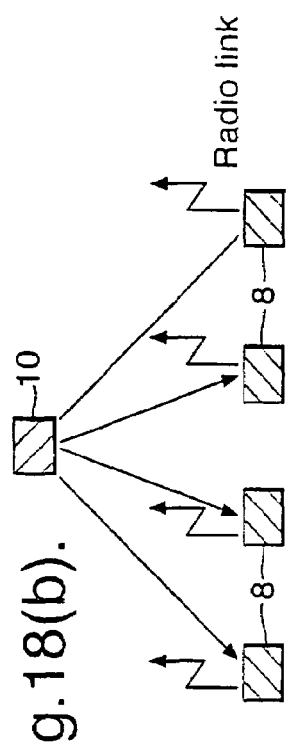
FIG. 18(a) to (c) illustrate different arrangements for local area networks.
Figure 18B:
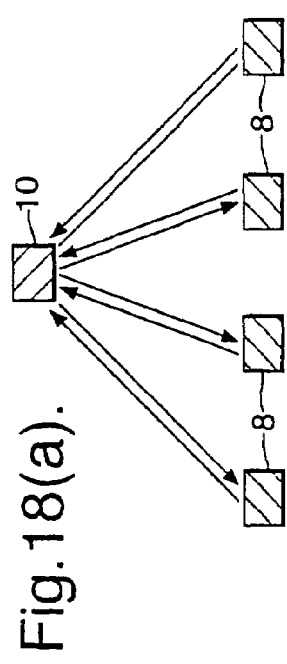
Figure 18C:
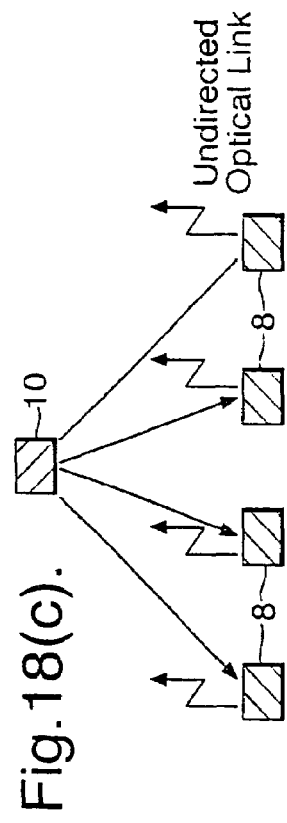
Figure 19:
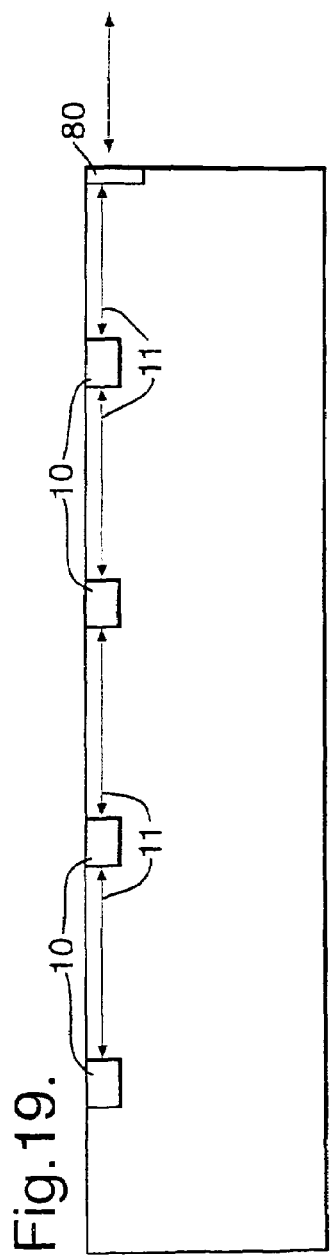
FIG. 19 illustrates intercommunication between base stations in a local area network.

In the system described above, the data links are symmetrical in that each end of the link contains an identical transmitter and receiver. However, there are circumstances where a high bandwidth is only required in one direction, such as for web browsing. In this case, other modes of operation are possible. FIG. 18 illustrates various configurations. FIG. 18(a) shows the bidirectional system. In FIG. 18(b) only the down link is a direct line of sight optical link, with the up link being via radio (and thus of lower bandwidth). In FIG. 18(c) the up link is a diffuse optical link (again of lower bandwidth). The system may also include multiple base stations as illustrated in FIG. 19, each interconnected with optical links. A transceiver 80 is also provided for an external wireless link which can be optical or radio. For clarity, the base stations are not shown in FIG. 19.

Of course it is possible for the transceivers at the base station and receiver to be provided with both optical and radio or optical line of sight and optical diffuse transceivers. These transceivers could be used selectively according to bandwidth, cost or any other criteria. It is possible for the radio link to be used for data requests, and the optical link to be used for transfer of data when the user is within the optical coverage area.

The invention claimed is:

1. An optical wireless LAN comprising at least one base station and a plurality of terminal stations, the at least one base station comprising an optical transmitter providing a line-of-sight optical downlink to transmit data to a terminal station receiver in each of the plurality of terminal stations,
    wherein each of the plurality of terminal stations is provided with a terminal station transmitter providing an uplink for transmitting data to a base station receiver in the at least one base station, said uplink comprising at least one of an undirected optical link and a radio link, and
    wherein the optical transmitter comprises: a) an integrated solid state light emitter comprising a two dimensional unit cell array of solid state light sources formed in an emitter layer and superposed on a corresponding two dimensional unit cell array of respective drive circuits formed in a driver layer, each drive circuit for producing a shaped drive signal for the corresponding light source in response to an input logic signal, wherein the surface area of each unit cell of the drive circuit array is less than or equal to the surface area of each unit cell of the light source array, whereby each drive circuit is confined within a region underlying the corresponding light source unit cell; and b) at least one adaptive optical element positioned in the path of light from the light sources.

* * * * *